United States Patent [19]

Nagai et al.

[11] Patent Number: 4,785,374

[45] Date of Patent: Nov. 15, 1988

[54] ZINC-METALLIZED BASE MATERIAL FOR METALLIZED CAPACITOR AND PROCESS FOR ITS PRODUCTION

[75] Inventors: Susumu Nagai, Nakatsugawa; Takamasa Ibaraki, Tokyo; Hisatoshi Kamotani, Nakatsugawa; Tsunetatsu Yamauchi, Nakatsugawa; Makoto Imai, Nakatsugawa, all of Japan

[73] Assignee: Honshu Seishi Kabushiki Kaisha, Tokyo, Japan

[21] Appl. No.: 86,047

[22] PCT Filed: Nov. 27, 1986

[86] PCT No.: PCT/JP86/00607
§ 371 Date: Jul. 28, 1987
§ 102(e) Date: Jul. 28, 1987

[87] PCT Pub. No.: WO87/03419
PCT Pub. Date: Jun. 4, 1987

[30] Foreign Application Priority Data

Nov. 30, 1985 [JP] Japan ................. 60-270565

[51] Int. Cl.⁴ .................. H01G 1/01; B05D 5/06
[52] U.S. Cl. ........................ 361/305; 427/81
[58] Field of Search ............ 361/303, 304, 305; 427/79, 81

[56] References Cited

U.S. PATENT DOCUMENTS 2,727,297  12/1955  Fralish et al. .............. 361/304 X

FOREIGN PATENT DOCUMENTS

| 2234510 | 1/1974 | Fed. Rep. of Germany | 427/81 |
| 2551897 | 5/1977 | Fed. Rep. of Germany | 427/81 |
| 1415310 | 9/1965 | France | 427/81 |
| 71882 | 5/1982 | Japan | 427/81 |

*Primary Examiner*—Donald A. Griffin
*Attorney, Agent, or Firm*—Flynn, Thiel, Boutell & Tanis

[57] ABSTRACT

A zinc-metallized base material for metallized capacitors and a process for its production in which a vacuum-deposited zinc layer being formed on at least one side of a base material composed of film or thin capacitor paper, and a surface protective layer composed of a substance which shows a predetermined vapor pressure at a predetermined temperature being provided thereon in a predetermined thickness to thereby improve the humidity resistance of the vacuum-deposited zinc layer.

6 Claims, 2 Drawing Sheets

ZINC-METALLIZED BASE MATERIAL FOR METALLIZED CAPACITOR AND PROCESS FOR ITS PRODUCTION

BACKGROUND OF THE INVENTION

The present invention relates to a zinc-metallized film and a vacuum-deposited zinc metallized paper for making metallized capacitors (hereinafter called "zinc-metallized base material for capacitors" generically), and is particularly concerned with a zinc-metallized base material for capacitors functioning remarkably well for use to make heat-pressed capacitor elements and a process for its production.

TECHNICAL FIELD

A metallized base material for use in capacitors, in which an electrode is formed by vacuum depositing a metal, such as zinc, aluminum or the like, on a film, such as polypropylene film, polyester film and the like or on a thin capacitor paper, is very popular presently. The thickness of the vacuum-deposited metal layer of the base material is very thin normally from 100 to 600 Å. Therefore, the metal layer is easily to a hydroxide or an oxide because of the water content or oxygen in the air when it is left to stand. The electric conductivity deteriorates consequently so that the metal layer is not useful as a capacitor electrode. The metal layer is severely denatured when it is left for a long time under high-temperature and high-humidity conditions in a half-finished state for example, as a winding material or capacitor element, particularly at the time of capacitor manufacture.

The most common metals for vacuum depositing indlude aluminum and zinc. They have outstanding electrical characteristics because the capacitance variation is minimized when they are used to make a capacitor and their current resistance is high. As compared with aluminum, zinc is inferior particularly in its resistance to humidity.

In view of the circumstances described above, manufacturers of the metallized base materials exercise a strict quality control so as avoid the aforementioned denaturation on the base material a product. The fact is that the metallized base material is packaged in a high barrier film which exhibits less humidity permeability and oxygen permeability, a desiccating agent (such as silica gel or the like) is sealed in the interior of package so as to lower the humidity during warehousing and transportation, and, further, the warehousing temperature is controlled not to exceed 30° C. Thus, direct measures for preventing the aforementioned metallized base material from being denatured (deteriorated) by humidity absorption and oxidation have not been taken hitherto. Rather, attention has been paid solely to a packaging control for storage to, thus coping with the situation by means of an indirect method.

DISCLOSURE OF THE INVENTION

In view of the actual circumstances mentioned above, the invention is intended for solving the aforementioned problem directly instead of taking the indirect means for prevention of denaturation of the metal layer as above mentioned. That is, according to the aforementioned indirect means, the metallized base material is exposed to denaturation once it is unpacked and hence it must be used as quickly as possible, and still worse, the temperature and humidity must be taken into consideration even in the process for manufacturing the capacitors, thus involving various problems. In order to solve such problems thoroughly, the inventors provide such means as will prevent humidity absorption and oxidation from occurring thereafter by forming a protective layer on the surface of the metallized base material concurrently with or after manufacture of the base material.

The invention solves the problems by employing technical means as defined in the claims. However, the following case has been found to have something to do with the invention by the inventors, which will be referred to hereunder accordingly. That is, the case refers to an invention relating to a metallized film for an AC capacitor as disclosed in Japanese Patent Laid-Open No. Sho 59-227115. This is not intended for protecting the metallized base material against denaturation but rather, it employs the following means in view solely of the working of the capacitor as a finished product. The working voltage range of capacitors has expanded lately, and their use at a high potential gradient is increasing. The surface of a metallic electrode, such as aluminum, zinc or the like, changes partly to a sort of oxide, and it loses its function as the electrode consequently and becomes to an electric insulator. Recognizing that a decrease in capacitance may result in this case, the metallized layer should be prevented from failure and oxidation by metallizing zinc or aluminum on a polypropylene film and providing an organic insulation layer such as resin, silicone oil or the like, further thereon to a certain thickness. However, there is proposed only a solution whereby PET or PP of 1,000 Å thick is employed for insulation in case the capacitance variation after 500 hours is to be 4% or below as a concrete means for solving the problem. Hence it is never recognized practically as solving the problem that the present invention solves.

The invention also aims at removing a disadvantage at the time of heat setting which disadvantage is capable of being a serious problem when a zinc-metallized base material of this kind is used on a heat-pressed capacitor. Now, as is well known, a heat-pressed capacitor is manufactured by having a zinc-metallized film wound thereon when a capacitor element is manufactured and it is subjected to a heat-press normally at 100° to 180° C. in temperature and 15 to 100 kg/cm² in pressure. In this case, a disadvantage may arise on the contrary simply from, for example, applying oils such as silicone oil and the like on the surface of the base material. That is, since organic matter such as the aforementioned oil or the like reevaporates in the capacitor element at the time of the heat-press, a voids arise in the capacitor because of the heat setting, thus causing an internal discharge easily. In case the capacitor is manufactured in such a state, the metallized layer is fractured due to the heat generated by the internal discharge during use, and the life is considerably shortened by an increase of the loss due to discharge. Thus, it is apparent that the above-mentioned means is still not proper for obtaining a metallized base material suitable for the heat-pressed capacitors and, hence, it does not lead to a solution of the problem.

The circumstances being such as above-mentioned, the inventors have developed a novel processing means whereby the humidity resistance of the metallized base material, for which a strict control of handling is required hitherto, can sharply be improved without deteriorating its electrical characteristics, and at the same time, the above-mentioned disadvantage will never arise even in case the metallized base material is used for making heat-pressed capacitors.

That is, by making a study earnestly of each problem mentioned above, the inventors have found that the problems pointed out above can be solved by an arrangement wherein a vacuum-deposited zinc layer is formed on at least one side of a base material composed of a film or thin capacitor paper, and then a material having an extremely limited vapor pressure is built up thereon to a specified thickness. More specifically, the humidity resistance is improved by forming a surface protective layer, consisting of oil having 0.1 mmHg vapor pressure at a temperature in the range of 150° to 290° C. on the vaccum-deposited zinc layer to a thickness of 7 to 500 Å. An excessively prudent packaging and handling is not required, unlike the prior art procedure, and there is finally obtained a suitable zinc-metallized base material free from any disadvantage when used as a zinc-metallized base material for the heat-pressed capacitor.

For obtaining the aforementioned base material, the invention further proposes a process wherein a vacuum-deposited zinc layer is formed at least on one side of the base material composed of a film or thin capacitor paper, in a vacuum-depositing apparatus, and then an oil, such as dimethylsilicone oil, silicone oil for a vacuum pump or the like, fatty acids, salts of fatty acids or paraffin wax is subjected to form a layer vacuum deposition to of the oil having a thickness of 7 to 500 Å by the same vacuum-depositing apparatus. According to the aforementioned process, the desired product is obtainable industrially with ease.

As described hereinabove, the invention is intended for enhancing the performance of zinc as a vacuum-depositing metal, compare to aluminum. Zinc is superior in electrical characteristics such that the capacitance variation when used in a capacitor is minimized and the current resistance is satisfactory as compared with aluminum, but is inferior to aluminum in the aspect of moisture resistance.

Meanwhile, as described hereinabove, the invention is characterized in that a specific material, such as oil or the like having 0.1 mmHg vapor pressure in the temperature range 150° to 290° C., is provided on the surface of a vacuum-deposited zinc layer. Therefore, the vapor pressure may change according as molecular weight changes even in the case of a material of the same kind as the above-mentioned, and when it comes outside the range limited by the invention, a product intended by the invention is not obtainable. That is, in case the temperature corresponding to the 0.1 mmHg vapor pressure of the oil is not at least 150° C., evaporation in the heat press process becomes active at the time of capacitor manufacture, voids occur due to expansion, the capacitor is then capable of internal discharge to and it is not useful any more. Then, if the temperature, corresponding to the 0.1 mmHg vapor pressure of the oil, exceeds 290° C., the whole apparatus must be structured to withstand high temperatures for evaporating oils on a vacuum-depositing apparatus or the like, which is not practical. Further, another problem may arise on the heat resistance of the oil itself.

Oils referred to in the invention are not particularly limited, subject to the vapor pressure being within the aforementioned range. However, oils such as dimethyl-polysiloxane, other methylphenyl polysiloxanes, silicone oils for vacuum pump and the like are preferable, and fatty acids, salts of fatty acids and wax are also suitable. As fatty acids and salts of fatty acids, for example, stearic acid, palmitic acid, oleic acid and its metal salts such as, zinc, calcium, copper, and lithium salt, may be used.

The base material used in the invention is a film or thin capacitor paper. The film is not particularly limited, however, polyester film, polypropylene film polycarbonate film and the like are preferable. Needless to say, the film surface may be subjected to a corona discharge thereon, thereby enhancing the sticking force of the vacuum-deposited zinc.

Then, the aforementioned surface protective layer is formed to the thickness of 7 to 500 Å. A thickness of less than 7 Å is not effective in preventing oxidation of the vacuum-deposited zinc layer, and thus the humidity resistance the invention intends to obtain cannot be improved thoroughly. When the thickness exceeds 500 Å to the contrary, the tan $\delta$ characteristic of the capacitor deteriorates, while the humidity resistance is improved. That is, if the protective layer is too thick, then the oils applied on the capacitor element are reevaporated on heating after heat pressing at the time of capacitor manufacture. Thus, a uniform heat setting is not secured, and a multiplicity of fine voids may remain internally as a result. Therefore tan $\delta$, particularly in a domain where corona discharge at 300 V or over aries, sharply increases. It is very important that the surface protective layer should be provided as thin as possible and also uniformly so as to ensure a satisfactory electrical characteristic and moisture resistance therefor, and various methods are conceivable. For example, a method employing a roll coater may be used. However, in view of the small thickness, a method whereby the aforementioned material is sprayed in mist form on the surface of the vacuum-deposited zinc layer is preferable. However, vacuum depositing developed by the inventors will be such method as is best for operation stble industrially, which will be described below in detail.

BEST MODE FOR CARRYING OUT THE INVENTION

Figure 1:
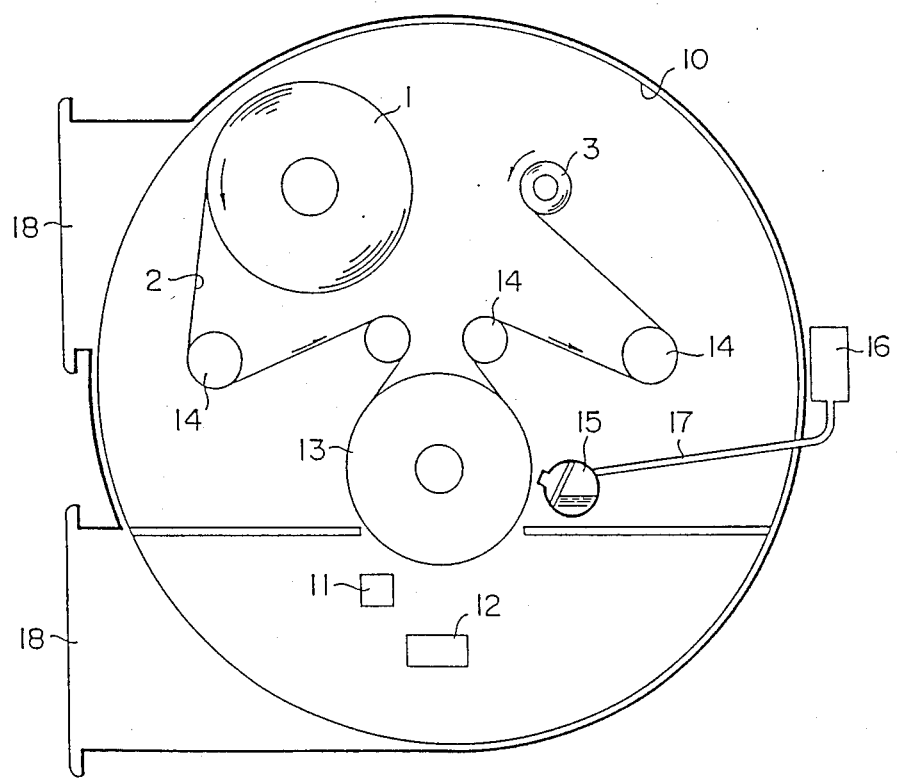
FIG. 1 is a schematic view of a vacuum depositing apparatus given in one example where a process according to the invention is put into practice.

FIG. 1 is a schematic view of a vacuum-depositing apparatus employed in one preferred embodiment of the invention. In the drawing, a base material 2 delivered from an unreeler 1 has copper or silver nucelating material, supplied from a nucleus evaporating source 11, metallized preliminarily thereon in a vacuum of $10^{-2}$ to $10^{-3}$ Torr formed provided within the body of a vacuum-depositing apparatus 10. The base material is then subjected to regular metallizing, controlled to from 100 Å to 600 Å in thickness, at a zinc evaporating source 12. The reference numeral 13 denotes a cooling roll, and 14 denotes guide rolls.

In the invention, an oil is evaporated by an oil coater 15 provided within the same vacuum-depositing apparatus 10 interruptedly to the aforementioned process. Immediately after the zinc-metallizing process, an oil surface protective layer is formed in superposition on the vacuum-deposited zinc layer to a thickness of 7 to 500 Å. The oil has an inherent vapor pressure depending on the temperature obtained by heating the coater 15 under the above described degree of vacuum within the vacuum-depositing apparatus. Therefore the quantity of the evaporation can be controlled arbitrarily and the coating thickness can be changed thereby. After the protective layer is formed on the surface of the vacuum-deposited zinc layer, it is taken up on a reel 3, and a zinc-metallized base material for capacitors of the invention is manufactured accordingly. The reference numeral 16 in FIG. 1 denotes an oil storage tank, 17 denotes a feed pipe therefor, and 18 denotes an exhaust port.

The base material for capacitors which is used in the invention can be polyester film, polypropylene film, polycarbonate film and the like other than a thin capacitor paper used normally. These are fed to the continuous vacuum depositing apparatus to make a product according to the aforementioned process.

Then, according to the invention, the zinc-metallizing process and the surface protective layer forming process described above can be applied also on the back thereof, and if this is done, then a metallized base material with a vacuum-deposited zinc layer and a protective layer on both sides will be obtainable. As described, the thickness of the protective layer is determined according to the quantity of evaporation of the oils. However, the quantity of the evaportion can easily be controlled by controlling the heating temperature. Accordingly, a very thin and uniform protective layer can be formed easily on the zinc-metallized film.

EMBODIMENT

The invention will now be described in detail further with reference to the embodiment. For measuring tan δ, the base material obtained by the invention is wound according to a normal process and then is subjected to a heat press at 150° C. and 30 kg/cm² for 10 minutes, zinc is sprayed as a particle to an end surface of the wound capacitor element by an arc metallization device, a lead wire is then connected to make a 2.5 μF capacitor as a prototype, which is subjected to the measurement by means of a shading bridge at a temperature of 23° C.

EXAMPLE 1

Zinc was vacuum-deposited to the thickness of 400 Å on one side of a polyester film 5 μm thick according to a normal process. Further, a zinc-metallized base material for capacitors of the invention was obtained by forming a surface protective layer 7 to 500 Å thick in the identical vacuum-depositing apparatus on which zinc was vacuum-deposited, by means of the oils shown in Table 1. Then the moisture resistance and value of tan δ were obtained through measurement thereof. The results are given in Table 2 and FIG. 2. For measurement of the moisture resistance, the base material was allowed to stand in an atmosphere of 70° C. and 65% RH, and the resistance value of the metallized film was measured with the passing of time. As a comparative example, a protective layer was formed by means of oils outside the range according to the invention, a zinc-metallized material for capacitors was made exactly in the same way as the embodiment otherwise, and then values were measured for similar measuring items.

TABLE 1

| Symbol | Component | Trade name* | Temperature corresponding to vapor pressure at 0.1 mmHg | Appreciation ΔMR/MRo (%) | tan δ (%) | Remarks |
| --- | --- | --- | --- | --- | --- | --- |
| A | Petroleum fraction | Neovac ME-250[*1] | 100° C. | 105 | 0.28 | |
| B | " | Neovac ME-300[*1] | 140° C. | 100 | 0.26 | |
| C | " | Neovac MR-100[*1] | 148° C. | 100 | 0.25 | No good for heat deterioration |
| D | Dimethylpolysiloxane | KF-96L 2CS[*2] | 75° C. | 110 | 0.31 | Silicone oil |
| E | Dimethylpolysiloxane | KF-96 10CS[*2] | 130° C. | 105 | 0.26 | " |
| F | Dimethylpolysiloxane | KF-96 20CS[*2] | 222° C. | 50 | 0.22 | " |
| G | Dimethylpolysiloxane | KF-96 50CS[*2] | 260° C. | 45 | 0.22 | " |
| H | Dimethylpolysiloxane | KF-96 100CS[*2] | 285° C. | 35 | 0.21 | " |
| I | Dimethylpolysiloxane | KF-96 500CS[*2] | 350° C. | — | — | Deteriorates in heat resistance at evaporating temperature of silicone oil |
| J | Methylphenyl polysiloxane | DC-702[*3] | 185° C. | 30 | 0.21 | Silicone oil |
| K | Methylphenyl polysiloxane | HIVAC F4[*2] | 180° C. | 25 | 0.22 | " |
| L | Methylphenyl polysiloxane | HIVAC F5[*2] | 210° C. | 15 | 0.22 | " |
| M | Alkylnaphthylene | LION A[*4] | 180° C. | 40 | 0.21 | |
| N | Polydiphenylether | SKA[*1] | 160° C. | 50 | 0.23 | |
| O | Stearic acid | Guaranteed | 151° C. | 65 | 0.21 | |

TABLE 1-continued

| Symbol | Component | Trade name* | Temperature corresponding to vapor pressure at 0.1 mmHg | Appreciation ΔMR/MRo (%) | tan δ (%) | Remarks |
|---|---|---|---|---|---|---|
| | | reagent | | | | |

Appreciation:
ΔMR/MRo (%)... Rate of change after 72 hours to initial vacuum-deposited layer resistance value MRo. Practical range is 100% or below.
tan δ (%)... Dielectric loss tangent of heat press type dry capacitor at 300 V and 60 Hz. Practical range is 0.24% or below.
*Name of manufacturers:
(*1)Matsumura Sekiyu,
(*2)Shin-etsu Chemical Ind.
(*3)Toray Silicone,
(*4)Lion

TABLE 2

| Item | Thickness of surface protective layer Å | Voltage-tan δ(%) at 23° C. and 60 Hz | | | Moisture resistance test Rate of change of vacuum-deposited layer resistance (%) | | |
|---|---|---|---|---|---|---|---|
| | | 100 V | 200 V | 300 V | After 24 hrs | After 48 hrs | After 72 hrs |
| Comparative example | 5 | 0.198 | 0.199 | 0.225 | 25 | 55 | 130 |
| Operative example | | | | | | | |
| 1 | 10 | 0.199 | 0.201 | 0.223 | 20 | 45 | 75 |
| 2 | 40 | 0.197 | 0.201 | 0.226 | 15 | 25 | 35 |
| 3 | 70 | 0.198 | 0.200 | 0.224 | 6 | 13 | 24 |
| 4 | 100 | 0.197 | 0.198 | 0.221 | 3 | 9 | 15 |
| 5 | 200 | 0.196 | 0.199 | 0.227 | 1 max. | 4 | 8 |
| 6 | 300 | 0.197 | 0.202 | 0.229 | " | 1 max. | 1 |
| 7 | 500 | 0.196 | 0.203 | 0.230 | " | " | 1 |
| Comparative example | | | | | | | |
| 1 | 600 | 0.197 | 0.205 | 0.250 | " | " | 1 max. |
| 2 | 800 | 0.209 | 0.214 | 0.394 | " | " | " |
| 3 | 1000 | 0.213 | 0.220 | 0.603 | " | " | " |
| Existing goods | 0 | 0.198 | 0.200 | 0.224 | 50 | 150 | 200 |

Oils with symbol K in Table 1 are used for operative examples.

Figure 2:
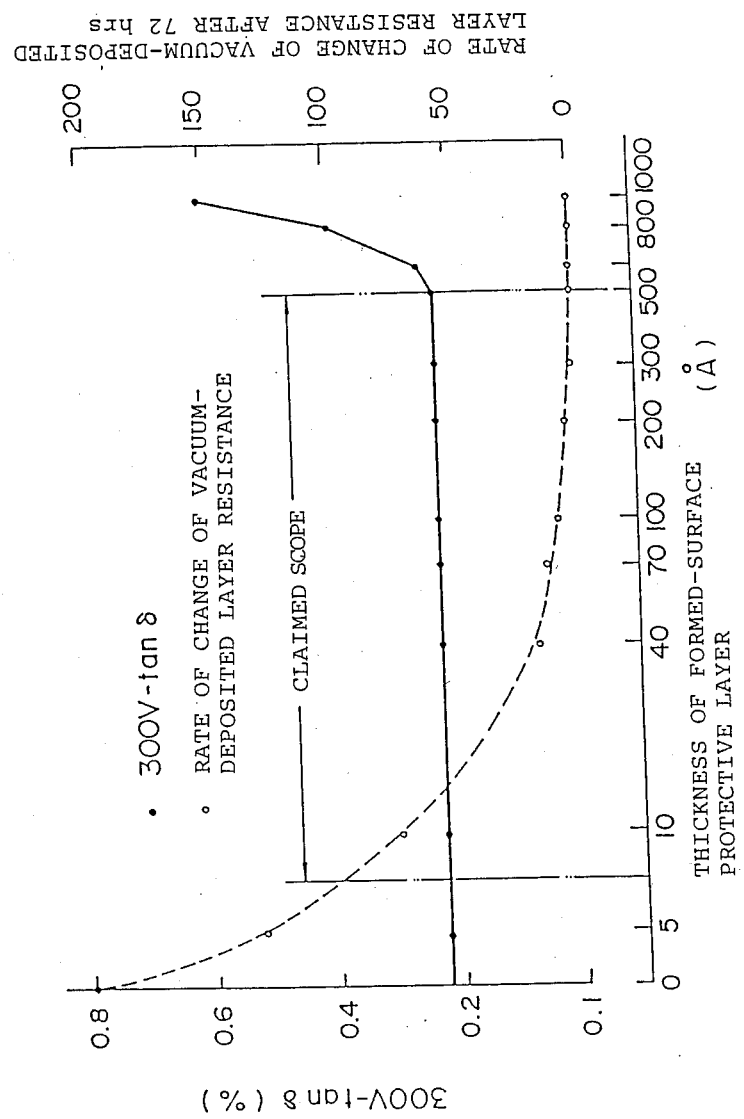
FIG. 2 is a graph with the thickness of the surface protective layer taken as the abscissa axis and 300 V-tan $\delta$ and a variation of a vacuum-deposited layer resistance taken on the ordinate axis.

As will be apparent from Table 2 and FIG. 2, the film resistance value sharply changes when the surface protective layer of the invention is not provided, and an effect in improving the humidity resistance is also not expectable when the coated thickness is than 7 Å. On the other hand, it has been clarified that while an effect of improving the moisture resistance is appreciated, tan δ rises strikingly at 300 V so that the product is unserviceably practically when the thickness is greater than 500 Å.

EXAMPLE 2

An example of a circular capacitor element will be described next. Zinc was vacuum-deposited to the thickness of 280 Å on one side of a polyester film 4.5 μm thick, and then the silicone oil identified by K in Table 1 was applied to the thickness 200 Å on the metallized surface through vacuum deposition, thus obtaining a surface protective layer. The base material was slit to 70 mm in width and taken up as in the case of normal zinc-metallized film.

A capacitor element was wound from the zinc-metallized film, a zinc particle was sprayed on an end surface of the element, mounted with a lead wire then and subjected to a vacuum drying in an aluminum case, thus obtaining a capacitor 70 μF in capacitance impregnated with polybutene oil for measurement.

Electrical characteristics compared with the existing goods are shown in Table 3, wherein equivalent characteristics are ensured. On the other hand, from subjecting products according to the example to measurement under high-temperature and high-humidity conditions for checking the effect in improving the humidity resistance, it has been confirmed that the products have the humidity resistance sharply enhanced as compared with the existing goods. The results are shown in Table 3. The tests were carried out such that the products according to the example and the existing goods were wound 30 turns each, allowed to stand in the atmosphere of 70° C. and 65% RH for 24 hours and 72 hours, and then a variation of the metallized film resistance was observed.

TABLE 8

| Characteristic | Capacitance (μF) | Room temp. tan δ(%) | | 75° C. tan δ(%) | | Rate of change of vacuum-deposited layer resistance | |
|---|---|---|---|---|---|---|---|
| | | 200 V | 300 V | 200 V | 300 V | After 24 hrs | After 72 hrs |
| Operative example (Invention) | 71.2 | 0.210 | 0.224 | 0.130 | 0.150 | 4% | 11.3% |
| Comparative example (Existing goods) | 70.5 | 0.207 | 0.217 | 0.127 | 0.143 | 24% | 559% |

Meanwhile, the operative examples in Tables 1 to 3 indicate zinc-metallized films 4.5 μm and 5 μm thick are used as typical dielectrics. However, a base film working as the metallized base material or a thin capacitor paper working as the base, such as zinc evaporated polypropylene film, zinc-metallized polycarbonate film or the like used normally can also be used other than these examples. Hence it is not to be so specified. Similarly, the oils are not necessarily limited, and such silicone oil and wax as will have a vapor pressure characteristic at 0.1 mmHg at the temperature range 150° to 290° C. described hereinabove can be utilized satisfactorily. Then, the oil used for the aforementioned examples is a vacuum pump oil placed generally on the market.

As described in detail above, the invention comprises forming a protective film layer composed of a specific material for improving humidity resistance to a predetermined thickness on the surface of a zinc-metallized base material for capacitors. Therefore, it is effective enough so as to make unnecessary special product control features for the zinc-metallized base material, particularly for control of the temperature and humidity under a strict packaging mode. In other words, the invention is most useful in suggesting that a substantial improvement of humidity resistance for the zinc-metallized base material can be obtained without taking the special control measures that have been taken hitherto.

Further, it is significant industrially in respect particularly of solving defects and troubles, such as denaturation due to oxidation of the zinc-metallized film during the capacitor manufacturing process or during storage, which has occurred hitherto and increase in the metallized film resistance as well.

Moreover, the invention is effective to employ zinc which is superior in electrical characteristic but is inferior to aluminum regarding the property of denaturation as a deposited metal to produce capacitors better than capacitors made using aluminum.

According to the invention, furthermore, a normal quantity of oil can be applied to a steady state industrially on the zinc-metallized film extremely thin, uniformly and easily. Therefore, the base material is applicable as a base material for use on heat-pressed capacitors.

According to the invention, still further, the feature is that oils will be applied to a thickness of from 7 Å to 500 Å, and a coating film with an extremely thin screening effect is formed. However, a means for achieving the feature easily and stably is provided at the same time by controlling the degree of vacuum or the evaporating temperature of the oil. Since the process is carried out within a vacuum-depositing apparatus, the method is free from giving rise to a fatal defect on insulation from having the base film utilized as a dielectric for the capacitor contaminated by dust and dirt, and thus a method advantageous as compared with the case where oils are applied in the atmosphere can be provided accordingly.

What is claimed is:

1. A zinc-metallized base material for metallized capacitors comprising:
   a base material composed of film or thin capacitor paper;
   a vacuum-deposited zinc layer formed on at least one surface of said base material; and
   a surface protective layer deposited on said vacuum-deposited zinc layer, said surface protective layer having a thickness of 7 to 500 Å and consisting essentially of a material having a vapor pressure of 0.1 mmHg at a temperature in the range of 150° to 290° C. and being effective to improve the humidity resistance of said zinc layer.

2. A zinc-metallized base material for metallized capacitors as claimed in claim 1, wherein said surface protective layer consists essentially of an oil selected from the group consisting of dimethylsilicone oil and silicone oils for vacuum pumps.

3. A zinc-metallized base material for metallized capacitors as claimed in claim 1, wherein said surface protective layer consists essentially of a material selected from the group consisting of fatty acids, salts of fatty acids and paraffin wax.

4. A zinc-metallized base material for metallized capacitors as claimed in claim 1 in which said surface protective layer consists essentially of a material selected from stearic acid, palmitic acid, oleic acid and the zinc, calcium, copper and lithium salts thereof.

5. A zinc-metallized base material for metallized capacitors as claimed in claim 1 in which said surface protective layer consists essentially of methylphenyl polysiloxane oil.

6. A process for producing said zinc-metallized base material for metallized capacitors comprising the steps of:
   vacuum depositing a zinc layer on at least one surface of a base material composed of film or thin capacitor paper in a vacuum-depositing apparatus; and
   vacuum-depositing a surface protective layer on said vacuum-deposited zinc layer in the same vacuum-depositing apparatus, said surface protective layer having a thickness of 7 to 500 Å and being composed of a material having a vapor pressure of 0.1 mmHg at a temperature in the range of 150° to 290° C. and selected from the group consisting of dimethylsilicone oil, silicone oils for vacuum pumps, fatty acids, salts of fatty acids and paraffin wax.

* * * * *